United States Patent
Shimotoyodome

(10) Patent No.: US 6,310,678 B1
(45) Date of Patent: Oct. 30, 2001

(54) METHOD AND APPARATUS FOR SUPPLYING LIQUID CRYSTAL INTO CELL USING SIDE PORTS FOR BOTH VACUUM AND SUPPLY

(75) Inventor: Gyo Shimotoyodome, Tokyo (JP)

(73) Assignee: Beldex Corporation (JP)

( * ) Notice: Subject to any disclaimer, the term of this patent is extended or adjusted under 35 U.S.C. 154(b) by 0 days.

(21) Appl. No.: 09/366,514

(22) Filed: Aug. 3, 1999

(30) Foreign Application Priority Data

Jul. 8, 1999 (JP) .................................................. 11-184047

(51) Int. Cl.⁷ ................................................ G02F 1/1341
(52) U.S. Cl. ............................................ 349/189; 349/154
(58) Field of Search .................................... 349/189, 187, 349/154

(56) References Cited

FOREIGN PATENT DOCUMENTS

| | | |
|---|---|---|
| 3-102213 * | 1/1991 | (JP) . |
| 5-333352 * | 12/1993 | (JP) . |
| 08-262461 | 10/1996 | (JP) . |
| 09-22019 * | 1/1997 | (JP) . |
| 09-005761 | 1/1997 | (JP) . |
| 10-062791 | 3/1998 | (JP) . |
| 10-142615 | 5/1998 | (JP) . |

* cited by examiner

*Primary Examiner*—Kenneth Parker
(74) *Attorney, Agent, or Firm*—Eugene Stephens & Associates; Thomas B. Ryan

(57) ABSTRACT

A square sell 1 has a first port (5) and a second port (6) formed in its opposing first and second edge portions, respectively and third and fourth ports (7a, 7b, 8a, 8b) formed in its third and fourth edge portions respectively. An evacuating operation is performed at the second port (6). A liquid crystal injecting operation is performed at the first port (5) when a predetermined degree of vacuum is reached. At the third and fourth ports (7a, 7b, 8a, 8b), first, an evacuating operation is performed. Then, the evacuating operation is switched over to the liquid crystal injecting operation at the third and fourth ports (7a, 7b, 8a, 8b) by means of a switch-over operation of electromagnetic switch valves (15a, 15b, 16a, 16b).

8 Claims, 3 Drawing Sheets

METHOD AND APPARATUS FOR SUPPLYING LIQUID CRYSTAL INTO CELL USING SIDE PORTS FOR BOTH VACUUM AND SUPPLY

BACKGROUND OF THE INVENTION

This invention relates to a method and an apparatus for supplying a liquid crystal into a cell.

In general, a cell of a liquid crystal display exhibits a rectangular configuration. It has an injection port (first port) and an exhaust port (second port) formed in a first and a second edge portion of opposing short sides thereof, respectively. After the interior of the cell is evacuated to a predetermined degree of vacuum through the exhaust port, a pressurized liquid crystal is injected into the cell through the injection port. However, since a gap between two substrates constituting the cell is very narrow, the injected liquid crystal becomes increasingly large in pressure loss as it moves away from the injection port. For this reason, injection velocity of the liquid crystal coming through the injection port is lowered and therefore, much time is required to fill the cell with the liquid crystal, especially in the case where the cell is large in size.

Japanese Patent Unexamined Publication (Kokai) No. Hei 8-262461 discloses a method in which first, an evacuating operation is performed not only at the exhaust port but also at the injection port and when the interior of the cell reaches a predetermined degree of vacuum, the evacuating operation is switched over to a liquid crystal injecting operation at the injection port while the evacuating operation is continuously performed at the exhaust port. Although it is possible for this method to reduce the time required for evacuating the interior of the cell to a predetermined degree of vacuum, it is impossible for the method to reduce the time from the start of liquid crystal injection to the completion of liquid crystal injection.

In a method for supplying a liquid crystal disclosed in Japanese Patent Unexamined Publication (Kokai) No., Hei 9-5761, intermediate ports (third and fourth ports) are formed respectively in third and fourth edge portions of long sides of the cell orthogonal to the first and second edge portions. After the liquid crystal which has been injected into the cell from the injection port reaches the intermediate ports, a liquid crystal is also injected therein from the intermediate ports. By this, the time required for filling the liquid crystal can be reduced.

In the method disclosed in the second-mentioned Publication, no air is discharged through the intermediate ports. Therefore, the step for increasing the interior of the cell to a predetermined degree of vacuum and the following step for bringing the injected liquid crystal to the intermediate ports are substantially same as in the case where no intermediate ports are employed. Thus, time is not reduced in those steps.

SUMMARY OF THE INVENTION

It is, therefore, an object of the present invention to provide a method for minimizing the time required for supplying a liquid crystal into a cell.

A method according to the present invention is basically same as the conventional method in the respect that a liquid crystal is injected through a first port formed in a first edge portion and an evacuating operation is performed through a second port formed in the second edge portion. The features of the present invention reside in that at a third and a fourth port formed in the third and fourth edge portions, an evacuating operation is performed first and then, a liquid crystal injection is performed.

In one aspect of the present invention, there is provided a method including a first to third steps which are to be performed sequentially. In the first step, an evacuating operation is performed through second to fourth ports to evacuate an interior of a cell to a predetermined degree of vacuum. In the second step, a liquid crystal is injected through the first port while performing the evacuating operation through the second to fourth ports. In the third step, when or after a liquid crystal reaches the third and fourth ports, the evacuating operation is switched over to the liquid crystal injecting operation at the third and fourth ports, and the evacuating operation is continuously performed through the second port.

In another aspect of the present invention, there is also provided a method including a first and a second step which are to be performed sequentially. In the first step, an evacuating operation is performed through second to fourth ports to evacuate an interior of a cell to a predetermined degree of vacuum. In the second step, a liquid crystal injecting operation is started through a first port and simultaneously with this, the evacuating operation is switched over to a liquid crystal injecting operation at the third and fourth ports and the evacuating operation is continuously performed through the second port while performing the liquid crystal injecting operation through the first, third and fourth ports, thereby bringing the liquid crystal to the second port.

An apparatus for carrying out the method according to the present invention comprises (a) first to fourth connectors which are to be connected to the first to fourth ports, respectively, (b) liquid crystal supply means connected to the first port and for supplying a liquid crystal to an interior of the cell, (c) evacuation means connected to the second port and for evacuating the interior of the cell, and (d) connection switchover means for connecting the third and fourth ports to the evacuation means and then to the liquid crystal supply means.

DETAILED DESCRIPTION OF THE EMBODIMENT

Figure 1:
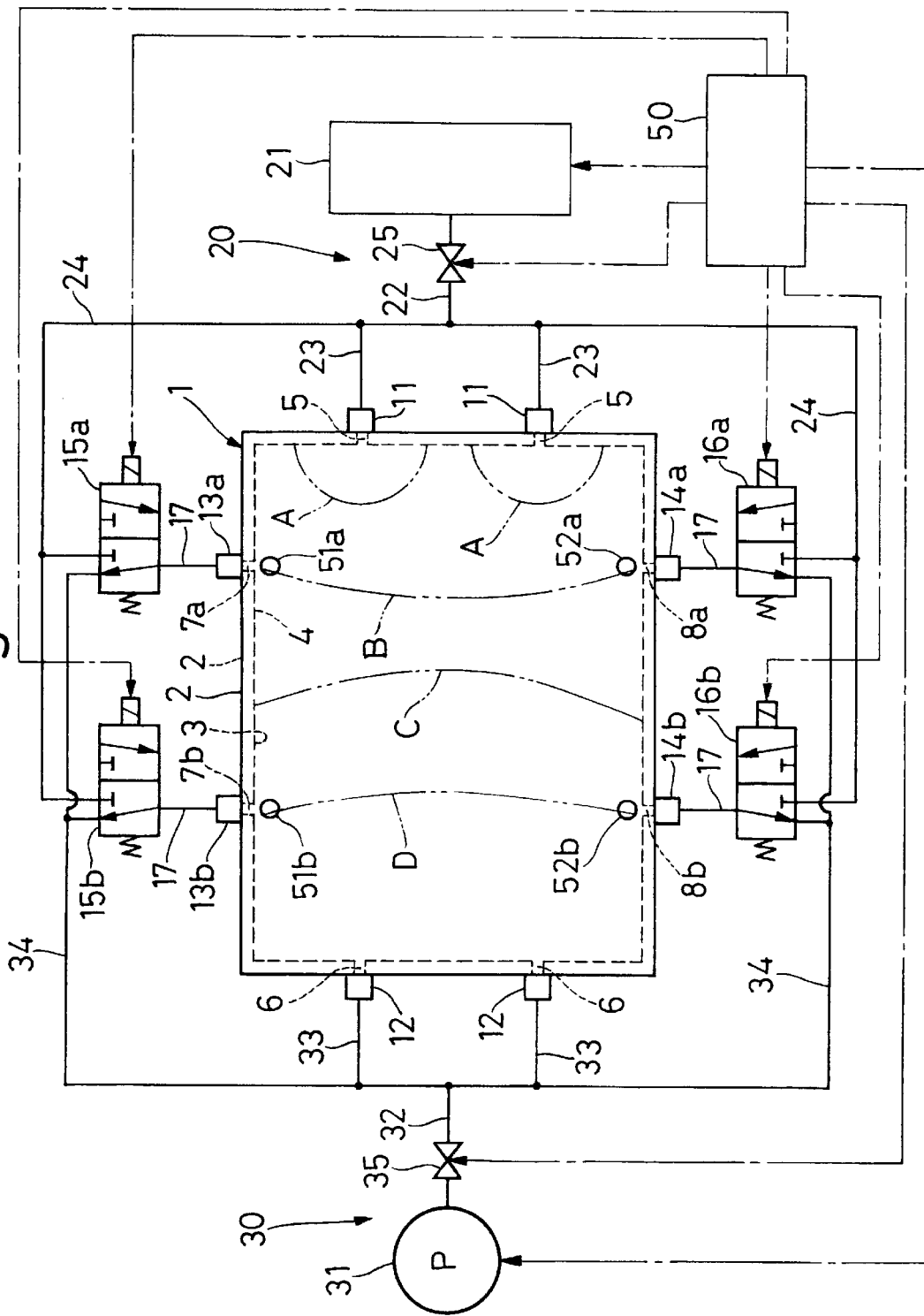
FIG. 1 is a view showing an apparatus for supplying a liquid crystal according to a first embodiment of the present invention.

The present invention will now be described with reference to the accompanying drawing. FIG. 1 shows an apparatus for injecting a liquid crystal according to a first invention of the present invention.

Firstly, a cell 1 as an object for injection of a liquid crystal will be described. The cell 1 is constituted by overlapping two rectangular substrates 2 which are made of glass, for example. Between the two substrates 2, a gap 3 having a micro-thickness (about 5 $\mu$m) is formed. Peripheral edge portions of the substrates 2 are bonded together by an adhesive agent 4. On a right edge portion (first edge portion) as one side of opposing two short sides of the cell 1, there are two places where no adhesive agent 4 is applied. Those two places are formed as first ports 5. Similarly, two second ports 6 are formed on a left edge portion (second edge portion) as the other short side of the cell 1. On an upper edge portion (third edge portion) as one side of opposing two long sides of the cell 1, a plurality of third ports 7a, 7b are formed at spaces in a longitudinal direction thereof. Similarly, on a lower edge portion (fourth edge portion) as the other long side of the cell 1, fourth ports 8a, 8b are formed at spaces in the longitudinal direction.

The apparatus for supplying a liquid crystal will now be described. This apparatus includes connectors 11, 12, 13a, 13b, 14a, 14b removably connected to the ports 5, 6, 7a, 7b, 8a, 8b of the cell 1, respectively, electromagnetic switch valves 15a, 15b, 16a, 16b (connection switchover means) connected to the connectors 13a, 13b, 14a, 14b (third and fourth connectors), respectively, through communication passages 17, an injection mechanism 20 for injecting a liquid crystal into the gap 3, and an exhaust mechanism 30 for suckingly exhausting air in the gap 3 of the cell 1.

The injection mechanism 20 includes a pressure tank 21 (liquid crystal supply means), a common injection passage 22 extending from the pressure tank 22, branch injection passages 23 branched from the common injection passage 22 and connected to the connectors 11 (first connectors), branch injection passages 24 branched from the common injection passage 22 and connected to the electromagnetic switch valves 15a, 15b, 16a, 16b, and a stop valve 25 disposed at the common injection passage 22.

The pressure tank 21 has a bellows containing a liquid crystal. An air pressure source (not shown) is applied to the outside of the bellows to pressurize the liquid crystal to a predetermined pressure so that the pressurized liquid crystal is transferred under pressure to the common injection passage 22.

The exhaust mechanism 30 includes a vacuum pump 31 (evacuation means), a common suction passage 32 extending from the vacuum pump 31, branch suction passages 33 branched from the common suction passage 32 and connected to the connectors 12 (second connectors), branch suction passages 34 branched from the common suction passage 32 and connected to the electromagnetic switch valves 15a, 15b, 16a, 16b, and a stop valve 35 disposed at the common suction passage 32. The common suction passage 32 is provided with a liquid crystal trap (not shown).

The electromagnetic switch valves 15a, 15b, 16a, 16b are constituted such that the communication passages 17 are connected to the suction passages 34 when they are in Off-state and the communication passages 17 are connected to the injection passages 24 when they are in On-state.

The liquid crystal supplying apparatus further includes liquid crystal sensors 51a, 51b, 52a, 52b (liquid crystal detection means) disposed in the vicinity of the ports 7a, 7b, 8a, 8b, respectively, and a controller 50 (control means) to which detection signal from the liquid crystal sensors 51a, 51b, 52a, 52b is input. The liquid crystal sensors 51a, 51b, 52a, 52b are capable of detecting arrival of liquid crystal by optical means, for example.

The pressure tank 21, the vacuum pump 31, the valves 15a, 15b, 16a, 16b, 25, 35 , etc. are controlled by the controller 50 so as to perform a liquid crystal supplying operation with respect to the cell 1. A method for supplying a liquid crystal by this controller 50 will be described hereinafter in sequential order, a first step, a second step and a third step.

In the first step, the stop valve 25 of the common injection passage 22 is closed and the electromagnetic switch valves 15a, 15b, 16a, 16b are held in their Off-state. Then, the stop valve 35 of the common suction passage 32 is opened and the vacuum pump 31 is actuated. By this, air in the gap 3 of the cell 1 is evacuated from not only the second port 6 but also the third ports 7a, 7b and fourth ports 8a, 8b. Therefore, the interior of the gap 3 can be evacuated to a desired degree of vacuum in a shorter time than the case where evacuation is performed only through the second port 6.

When a desired degree of vacuum is reached, the process proceeds from the first step to the second step. That is, the stop valve 25 is opened. By this, a liquid crystal is injected into the gap 3 from the first ports 5, as indicated by imaginary lines A of FIG. 1. Although this liquid crystal maintains the pressure given by the pressure tank 21 in the vicinity of the first ports 5, the pressure is lowered by the gap 3 as the liquid crystal moves away from the first ports 5.

In the second step, the evacuating operation through the ports 6, 7a, 7b, 8a, 8b are continued even after the start of injection of liquid crystal. By this, a forward end portion of the liquid crystal as indicated by an imaginary line A is pulled in a direction away from the injection port 5. Especially, the liquid crystal is pulled hard by means of evacuation through the third port 7a and the fourth port 8a which are located nearest to the liquid crystal. By this, injection velocity is maintained at a rather high level irrespective of pressure loss caused by the gap 3.

When the forward end portion of the liquid crystal reaches the right third port 7a as indicated by an imaginary line B, a detection signal is output from a corresponding liquid crystal sensor 51a. In response to this detection signal, the controller 50 turns on the electromagnetic switch valve 15a. Almost simultaneously with this, the forward end portion of the liquid crystal reaches the right fourth port 8a, a detection signal is output from a corresponding liquid crystal sensor 52a, and in response to this detection signal, the controller 50 turns on the electromagnetic switch valve 16a. By this, the evacuating operation through the ports 7a, 8a is stopped and a liquid crystal injecting operation is started. Then, the process proceeds to the third step.

The liquid crystal, which has been injected into the ports 7a, 8a from the pressure tank 21 through the injection passages 22, 23 and via the connectors 13a, 14a, is maintained in pressure given by the pressure tank 21. Therefore, the injecting operation is progressed at a dash.

Thereafter, the forward end portion of the liquid crystal is, as indicated by an imaginary line C, moved away from the ports 7a, 7b and is gradually lowered in pressure. On the other hand, at the second port 6 and the left third and fourth ports 7b, 8b, the evacuating operation is continued. Especially, due to evacuation through the ports 7b, 8b which are located nearer to the liquid crystal, the forward end portion of the liquid crystal is pulled hard. Therefore, injection velocity is maintained at a rather high level.

As indicated by an imaginary line D, when the forward end portion of the liquid crystal reaches the left third and fourth ports 7b, 8b, the controller 50 turns on the electromagnetic switch valves 15b, 16b in response to detection signal coming from the liquid crystal sensors 51b, 52b in the same manner as above. By this, at the left third and fourth ports 7b, 8b, the evacuating operation is switched over to the liquid crystal injecting operation. Since the liquid crystal, which has been injected from the ports 7b, 8b, is maintained in pressure given by the pressure tank 21 at the area in the vicinity of the ports 7b, 8b, the injecting operation is progressed at a dash. As the liquid crystal approaches the exhaust port 6, it is pulled hard by evacuation through the exhaust port 6 and its injection velocity is maintained at a rather high level.

As a result, the liquid crystal reaches the second port 6 to complete the injection operation in an extremely short time after the start of injection through the first port. After the completion of injection, the stop valves 25, 35 are closed and the connectors 11, 12, 13a, 13b, 14a, 14b are removed from the cell 1.

In the above first embodiment, since the liquid crystal injecting operation through the third and fourth ports 7a, 7b, 8a, 8b is performed only after the forward end portion of the liquid crystal reaches the injection ports 7a, 7b, 8a, 8b, bubble can positively be prevented from being remained between the forward end portions of the liquid crystal which is injected from different directions.

In the first embodiment, the evacuating operation is switched over to the liquid crystal injecting operation at the time the liquid crystal sensors 51a, 51b, 52a, 52b detect the arrival of the liquid crystal at the third and fourth ports 7a, 7b, 8a, 8b. However, the evacuating operation may be switched over to the liquid crystal injecting operation after the passage of a predetermined comparatively short time from the time the liquid crystal sensors 51a, 52b, 52a, 52b detect the arrival of the liquid crystal.

A second embodiment of the present invention will now be described with reference to FIG. 1. An apparatus for injecting a liquid crystal according to this second embodiment does not include the liquid crystal sensors 51a, 51b, 52a, 52b of the first embodiment and is different in switching timing from the first embodiment. More specifically, in the first step, an evacuating operation is performed through the second port 6, the third ports 7a, 7b and the fourth ports 8a, 8b as in the first embodiment.

Figure 2:
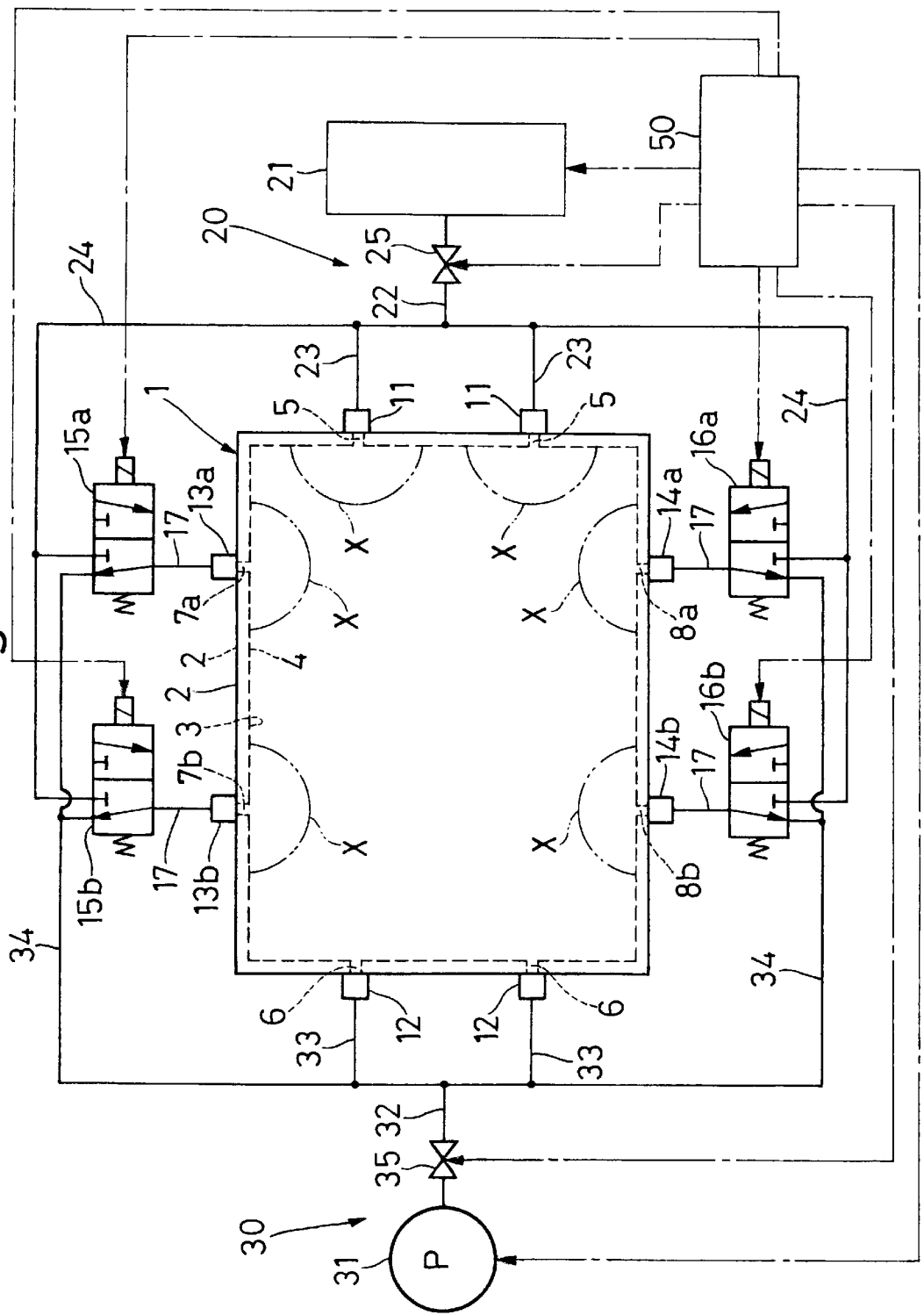
FIG. 2 is a view showing an apparatus for supplying a liquid crystal according to a second embodiment of the present invention.

In the second step, when the interior of the cell 1 reaches a predetermined degree of vacuum, the stop valve 25 is opened. At the same time, the electromagnetic switch valves 15a, 15b, 16a, 16b are turned on. By this, as indicated by imaginary lines X of FIG. 2, simultaneously with the start of injection of liquid crystal from the first ports 5, injection of liquid crystal from the third and fourth ports 7a, 7b, 8a, 8b is also started. Since injection of liquid crystal is started at the ports 7a, 7b, 8a, 8b without waiting for the arrival of liquid crystal, the time required for filling the cell with a liquid crystal can be more reduced.

Figure 3:
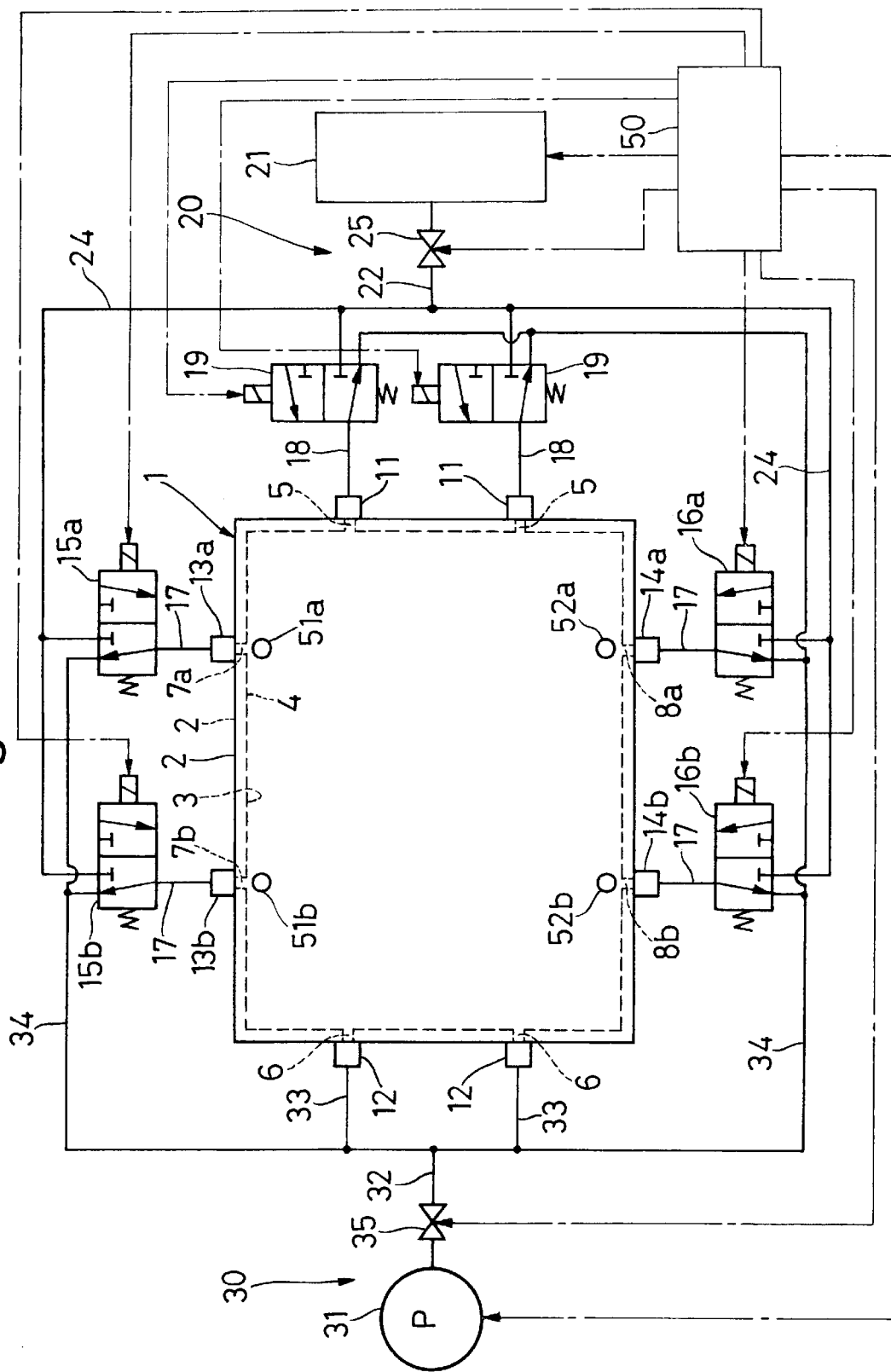
FIG. 3 is a view showing an apparatus for supplying a liquid crystal according to a third embodiment of the present invention.

A third embodiment of the present invention will now be described with reference to FIG. 3. In this third embodiment, the electromagnetic switch valve 19 is connected to the first ports 5 through the communication passages 18. This electromagnetic switch valve 19 is constituted such that the communication passages 18 are connected to the branch suction passages 34 when they are in Off-state and the communication passages 18 are connected to the branch injection passages 24 when they are in On-state. The remaining construction is same as the first embodiment. In this third embodiment, in the first step, the electromagnetic switch valve 19 is turned off and the evacuating operation is performed at the first ports 5. Since the evacuating operation is performed at all the ports 5, 6, 7a, 8a, 8b in the first step, the interior of the cell 1 can be evacuated to a predetermined degree of vacuum in a more reduced time. By turning on the electromagnetic switch valve 19 when the predetermined degree of vacuum is reached, the evacuating operation is switched over to the liquid crystal injecting operation at the first ports 5. Then, the process proceeds to the second step. Since the second and third steps are same as in the first embodiment, description thereof is omitted.

A fourth embodiment of the present invention will now be described. In this fourth embodiment, an apparatus which is same as the apparatus of FIG. 3 but which does not include the liquid crystal sensors 51a, 51b, 52a, 52b, is employed. In the first step, the evacuating operation is performed at all the ports 5, 6, 7a, 7b, 8a, 8b as in the third embodiment. At the time process proceeds to the second step when a predetermined degree of vacuum is reached, all the electromagnetic switch valves 15, 15b, 16a, 16b, 19 are turned on to switch over the evacuating operation to the liquid crystal injecting operation at the ports 5, 7a, 7b, 8a, 8b simultaneously. Since this second step is same as the second embodiment, description thereof is omitted. In this fourth embodiment, the time required for evacuating the interior of the cell and the time from the start of injection of liquid crystal to the completion can be minimized.

The present invention should not be limited to the above embodiments. Instead, various modifications can be made within the scope of the invention.

The liquid crystal supply means to be connected to the connectors 13a, 13b, 14a, 14b may be different from the liquid crystal supply means to be connected to the connectors 11. Similarly, the evacuation means to be connected to the connectors 13a, 13b, 14a, 14b may be different from the evacuation means to be connected to the connectors 12.

The connection switchover means may be comprised of stop valves separately disposed at the branch suction passage and the branch injection passage.

In the first and third embodiments, it is accepted that no evacuating operation is performed through the ports 6 and the ports 7b, 8b before the liquid crystal reaches the ports 7a, 8a and the evacuating operation is performed only through the ports 7a, 8a which are located nearer to the liquid crystal. It is also accepted that no evacuating operation is performed through the port 6 after the liquid crystal reaches the ports 7a, 8a but before the liquid crystal reaches the ports 7b, 8b, and the evacuating operation is performed only through the ports 7b, 8b which are located nearer to the liquid crystal.

In the first and third embodiments, the liquid crystal injecting operation through the ports 5 may be stopped after the liquid crystal reaches the ports 7a, 8a, and the liquid crystal injecting operation through the ports 7a, 8a may be stopped after the liquid crystal reaches the ports 7b, 8b.

In the first and third embodiments, the controller 50 may switch over the evacuating operation to the liquid crystal injecting operation through the ports 7a, 7b, 8a, 8b on a basis of the passage of time from the start of injection of the liquid crystal through the ports 5 instead of responding to the detection signal coming from the liquid crystal sensors 51a, 51b, 52a, 52b.

What is claimed is:

1. A method for supplying a liquid crystal into a rectangular cell having a first edge portion, a second edge portion opposing said first edge portion, and a third and a fourth edge portion orthogonal to said first and second edge portions, said first to fourth edge portions being formed with first to fourth ports respectively, said method comprising:
   injecting a liquid crystal into said cell through said first port;
   evacuating an interior of said cell through said second port; and
   at said third and fourth ports, an evacuating operation being performed first and then the evacuating operation being switched over to a liquid crystal injecting operation.

2. A method for supplying a liquid crystal according to claim 1, wherein said method includes first to third steps which are to be sequentially executed, in said first step, an evacuating operation being performed through said second to fourth ports until the interior of said cell is evacuated to a predetermined degree of vacuum;

in said second step, a liquid crystal being injected through said first port while performing an evacuating operation through said second to fourth ports, and in said third step, when or after a liquid crystal reaches said third and fourth ports, the evacuating operation being switched over to the liquid crystal injecting operation at said third and fourth ports, the evacuating operation being continuously performed through said second port, thereby bringing the liquid crystal to said second port.

3. A method for supplying a liquid crystal according to claim 2, wherein in said first step, the evacuating operation is performed at all said ports including said first port, the evacuating operation being switched over to a liquid crystal injecting operation at said first port when the interior of said cell reaches the predetermined degree of vacuum, thereby the process proceeding to said second step.

4. A method for supplying a liquid crystal according to claim 2, wherein a plurality of said third and fourth ports are formed in said third and fourth edge portions, respectively, at spaces in a longitudinal direction thereof, in said second step, the evacuating operation being switched over to the liquid crystal injecting operation at all said third ports in sequential order of nearer ports to said first edge portion, the evacuating operation being likewise switched over to the liquid crystal injecting operation at all said fourth ports in sequential order of nearer ports to said first edge portion.

5. A method for supplying a liquid crystal according to claim 1, wherein said method includes a first and a second step which are to be sequentially executed, in said first step, an evacuating operation being performed through said second to fourth ports until the interior of said cell is evacuated to a predetermined degree of vacuum, in said second step, a liquid crystal injecting operation being started through said first port, at the same time, the evacuating operation being switched over to the liquid crystal injecting operation at said third and fourth ports, the evacuating operation being continuously performed through said second port, thereby bringing the liquid crystal to said second port.

6. A method for supplying a liquid crystal according to claim 5, wherein in said first step, the evacuating operation is performed at all said ports including said first port, the evacuating operation being switched over to a liquid crystal injecting operation at said first port as well as at said third and fourth ports when the interior of said cell reaches the predetermined degree of vacuum, thereby the process proceeding to said second step.

7. An apparatus for supplying a liquid crystal into a rectangular cell having a first edge portion, a second edge portion opposing said first edge portion, and a third and a fourth edge portion orthogonal to said first and second edge portions, said first to fourth edge portions being formed with first to fourth ports respectively, said apparatus comprising:

(a) first to fourth connectors which are to be connected to said first to fourth ports, respectively;

(b) liquid crystal supply means connected to said first port and for supplying a liquid crystal to an interior of said cell;

(c) evacuation means connected to said second port and for evacuating the interior of said cell; and (d) connection switchover means for connecting said third and fourth ports to said evacuation means and then to said liquid crystal supply means.

8. An apparatus for injecting a liquid crystal according to claim 7, further comprising an additional connection switchover means, said additional connection switchover means connecting said first port to said evacuation means and then to said liquid crystal supply means.

* * * * *